(No Model.)
F. GROOS.
BROILER OR TOASTER.
No. 513,103. Patented Jan. 23, 1894.
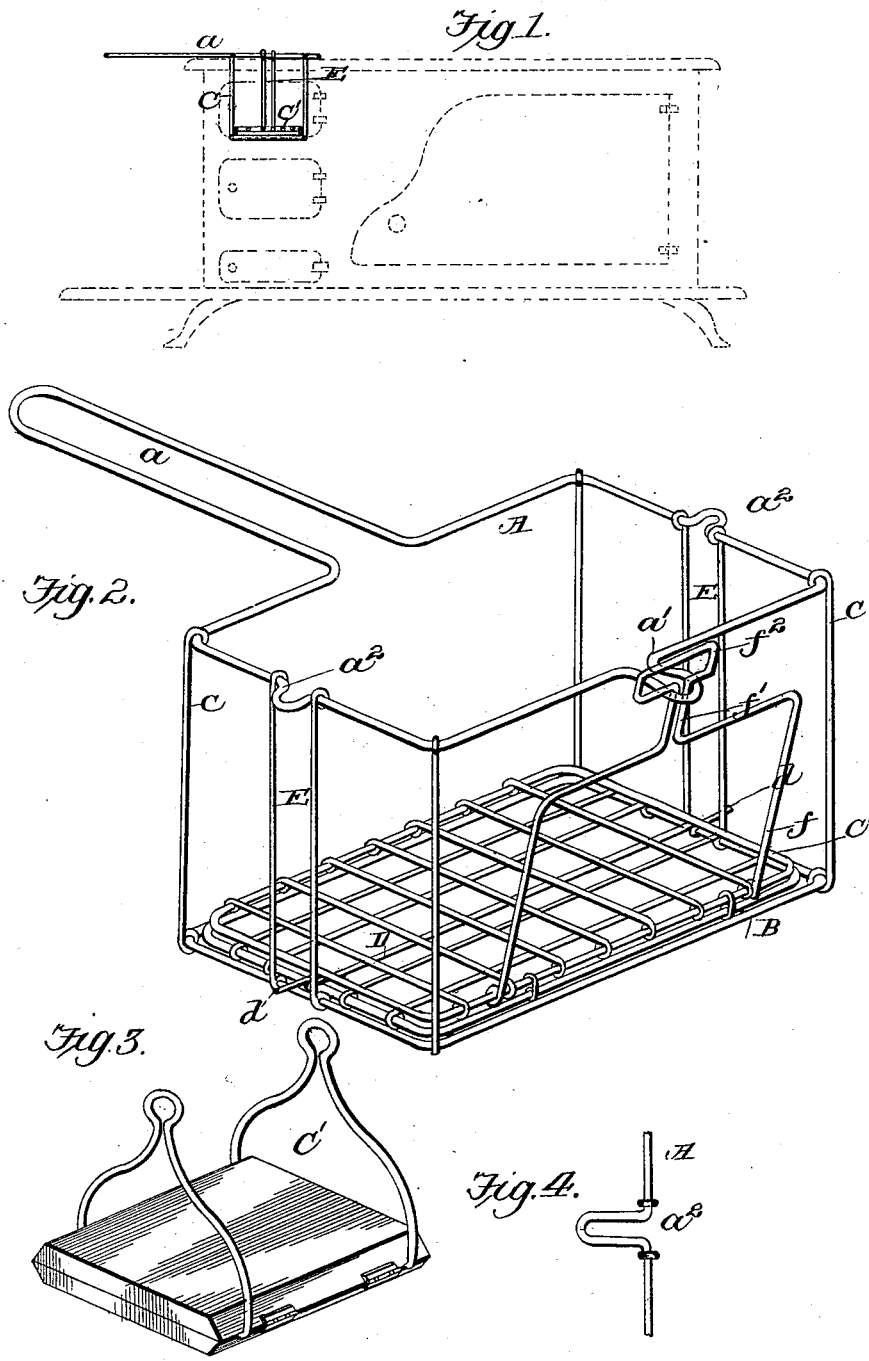
Witnesses
John Thuine
Chas. E. Brock
Inventor
Frederic Groos
by John Wedderburn
Attorney

UNITED STATES PATENT OFFICE.

FREDERIC GROOS, OF NAPLES, NEW YORK.

BROILER OR TOASTER.

SPECIFICATION forming part of Letters Patent No. 513,103, dated January 23, 1894.

Application filed March 25, 1893. Serial No. 467,644. (No model.)

*To all whom it may concern:*

Be it known that I, FREDERIC GROOS, of Naples, in the State of New York, have invented certain new and useful Improvements in Broilers or Toasters; and I do hereby declare the following to be a full, clear, and exact description of the invention, such as will enable others skilled in the art to which it appertains to make and use the same.

This invention relates to an improved culinary appliance; and is intended for use either as a meat broiler, bread toaster or frying pan.

In meat broilers, bread toasters and frying pans as now constructed, it is often impossible to cook with them on account of the fire in the stove being too low; and it is impossible to set them down into the stove without burning the article to be cooked.

The objects of my invention are to avoid these objections and provide a combination device that can be used when the fire is low as well as when the fire is at the usual or abnormal height.

A further object of my invention, is to provide an exceedingly cheap and simple contrivance, which shall be perfectly balanced and locked at all times, so that constant care to prevent turning, will not be necessary; and a still further object is to provide a simple and novel construction of reversible broiler or frying pan.

With these various objects in view, my invention consists essentially of a main or upper frame, a lower frame supported from the main frame, and a reversible broiler or frying pan journaled upon the lower frame, and locked on the upper one.

My invention consists also in certain details of construction and combination of parts, all of which will be fully described hereinafter and pointed out in the claims.

In the drawings hereto annexed: Figure 1, is a sectional view of a stove showing my device in operation. Fig. 2, is a view of the device detached from the stove, and Figs. 3 and 4, show details of construction.

In carrying out my invention, I employ an upper frame A, which is made of a stout wire, and is essentially rectangular in shape. A handle $a$, is formed integral with one of the sides of the frame, and at the opposite side, the wire is looped or bent upon itself, as shown at $a'$, and at each end of the frame, the wires are looped centrally as shown at $a^2$. The lower frame B, is also formed of wire, is rectangular in shape, and of the same size as the upper frame A. The lower frame is rigidly supported from the upper frame by means of the wire rods or bars C, C, one at each corner of the frame, the ends of such rods being coiled around the wire frames, as clearly shown, and thus providing a rigid contrivance consisting of the upper and lower frames, and the supporting corner rods. The upper frame is adapted to rest upon the stove cover, and thus hold the lower frame within the stove, and close to the fire while low. When the fire is high, this frame is turned lengthwise, and rests upon the stove covers the same as an ordinary broiler.

C', indicates the broiler, which is constructed the same as an ordinary broiler, that is; it is made in two sections hinged together and fastened by a clasp, the article to be broiled or toasted, being held between the sections as usual.

In the drawings I have shown the wires of the lower section of the broiler arranged longitudinally, and the upper wires transversely, but, this arrangement is not absolutely necessary.

D, indicates a journal rod, which extends the entire length of the broiler, the ends of said rod being coiled around the end of the broiler frame, and projecting a short distance beyond. These projecting ends $d\,d$, rest upon the end wires of the lower frame, and support the broiler in place within the lower frame, and in order to prevent any lateral movement of the rod D, I provide the wire guide rods E, E, which are attached to the upper frame at the inner bends of the loops $a^2$, and extend vertically downward until they reach the lower frame, where they are coiled around the end wires, thus providing a guide and bearing for the rod D. The loops $a^2$ are just long enough to permit the ends $d\,d$, to pass therethrough into the guiding rods to the lower frame.

F, indicates the combined reversing and locking handle attached to the broiler in such a manner that the sections can be closed and locked without interference. This handle F, is formed of a single piece of wire and consists of the essential rectangular lower portion $f$, the contracted portion $f'$ and the head or upper portion $f^2$. The contracted portion $f'$ is adapted to rest in the loop $a'$, or the handle $a$, while the head $f^2$ rests upon the loop $a'$, or handle $a$, and thus holds the broiler locked in a horizontal position.

When it is desired to reverse the broiler, the head $f^2$ is lifted and the contracted portion drawn out of the loop or handle and thrown to the other side. By this means, the broiler is reversed without taking the contrivance out of the stove. When it is desired to take the broiler out of the frame, the head $f^2$, is grasped and the entire broiler lifted vertically, the rod D, with its ends $d$ $d$, passing through the loop $a'$. It will thus be seen that I provide a cheap and simple contrivance, which can be set down in the stove, and one that can be reversed and locked in position within the stove.

Having thus described my invention, what I claim is—

1. In a broiler or toaster, the combination of an upper frame, having a handle, a lower frame suspended therefrom, a broiler or toaster journaled upon the lower frame, and a reversible locking handle and movably attached to the said broiler or toaster, and adapted to have locking engagement with the upper frame, substantially as described.

2. The combination, with the upper frame having a side and end, loops and a handle, of a lower frame, the supporting rods, the guiding rods, the reversible broiler, the journal rod, and the combined reversing and locking handle connected with the broiler, and adapted to engage the upper frame, substantially as shown and described.

In testimony whereof I have signed this specification in the presence of two subscribing witnesses.

FREDERIC GROOS.

Witnesses:
CHAS. E. BROCK,
FLORENCE T. BROOKE.